(12) United States Patent
Johnson et al.

(10) Patent No.: US 10,700,472 B2
(45) Date of Patent: Jun. 30, 2020

(54) CABLE CONNECTOR

(71) Applicant: Hubbell Incorporated, Shelton, CT (US)

(72) Inventors: Steven Johnson, Buchanan, MI (US); Krzysztof Korcz, Granger, IN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/154,285

(22) Filed: Oct. 8, 2018

(65) Prior Publication Data
US 2019/0109410 A1    Apr. 11, 2019

Related U.S. Application Data

(60) Provisional application No. 62/569,246, filed on Oct. 6, 2017.

(51) Int. Cl.
| | | |
|---|---|---|
| *H01R 13/58* | (2006.01) |
| *H02G 3/06* | (2006.01) |
| *H02G 3/08* | (2006.01) |
| *H02G 3/22* | (2006.01) |
| *H02G 15/10* | (2006.01) |
| *H02G 3/12* | (2006.01) |

(52) U.S. Cl.
CPC ....... *H01R 13/5816* (2013.01); *H02G 3/0625* (2013.01); *H02G 3/0658* (2013.01); *H02G 3/083* (2013.01); *H02G 3/22* (2013.01); *H02G 15/10* (2013.01); *H02G 3/12* (2013.01)

(58) Field of Classification Search
CPC .......................... H01R 13/5816; H02G 3/083
See application file for complete search history.

(56) References Cited

U.S. PATENT DOCUMENTS

| | | | |
|---|---|---|---|
| 3,006,661 | A | 10/1961 | Mcneill |
| 3,858,151 | A | 12/1974 | Paskert |
| 4,012,578 | A | 3/1977 | Moran et al. |
| 4,190,222 | A | 2/1980 | Appleton et al. |
| 4,277,641 | A | 7/1981 | Bauer et al. |
| 4,299,363 | A | 11/1981 | Datschefski |
| 4,302,035 | A | 11/1981 | Ochwat |
| 4,383,692 | A * | 5/1983 | Proctor .................. F16L 5/027 277/606 |
| 4,640,433 | A | 2/1987 | Jorgensen et al. |
| 4,880,387 | A | 11/1989 | Stikeleatherh et al. |
| 5,285,013 | A | 2/1994 | Schnell et al. |
| 5,374,017 | A | 12/1994 | Martin et al. |
| 5,422,437 | A | 6/1995 | Schnell |
| 5,442,141 | A | 8/1995 | Gretz |
| 5,607,323 | A | 3/1997 | Foster et al. |

(Continued)

*Primary Examiner* — James Harvey
(74) *Attorney, Agent, or Firm* — Michael Best & Friedrich, LLP

(57) ABSTRACT

A connector is configured to secure a configured to secure a conductor to an electrical box. The connector includes a body having an outer wall with a terminal edge, and a passageway extending along a longitudinal axis. A plurality of fingers is coupled to the body and extends toward the longitudinal axis. The plurality of fingers is cantilevered with the body. Each finger of the plurality of fingers includes a slot that provides communication into the passageway. The slot extends from the terminal edge of the body substantially along the length of each finger.

18 Claims, 16 Drawing Sheets

(56) References Cited

U.S. PATENT DOCUMENTS

| | | |
|---|---|---|
| 6,043,432 A | 3/2000 | Gretz |
| 6,080,933 A | 6/2000 | Gretz |
| 6,114,630 A | 9/2000 | Gretz |
| 6,143,982 A | 11/2000 | Gretz |
| 6,335,488 B1 | 1/2002 | Gretz |
| 6,380,483 B1 | 4/2002 | Blake |
| 6,460,638 B1 * | 10/2002 | Strunsee ............... H02G 3/083 16/2.2 |
| 6,604,400 B1 | 8/2003 | Gretz |
| 6,670,553 B1 | 12/2003 | Gretz |
| 6,682,355 B1 | 1/2004 | Gretz |
| 6,709,280 B1 | 3/2004 | Gretz |
| 6,780,029 B1 | 8/2004 | Gretz |
| 6,849,803 B1 | 2/2005 | Gretz |
| 7,211,744 B2 | 5/2007 | Jorgensen |
| 7,238,894 B1 | 7/2007 | Gretz |
| 7,304,251 B1 | 12/2007 | Gretz |
| 7,329,144 B1 | 2/2008 | Gretz |
| 7,432,443 B2 | 10/2008 | Johnson |
| 7,459,643 B2 | 12/2008 | de la Borbolla |
| 7,495,184 B1 | 2/2009 | Gretz |
| 7,576,290 B1 | 8/2009 | Korcz |
| 7,645,947 B2 * | 1/2010 | Kiely ............... H01R 13/745 174/650 |
| 7,824,213 B1 | 11/2010 | Korcz et al. |
| 7,922,020 B2 | 4/2011 | Wronski |
| 8,124,891 B1 | 2/2012 | Gretz |
| 8,664,543 B2 | 3/2014 | Chen |
| 8,759,674 B2 | 6/2014 | Korcz et al. |
| 8,816,222 B2 | 8/2014 | Pimentel |
| 9,247,662 B2 | 1/2016 | Korcz et al. |
| 9,252,578 B2 | 2/2016 | Korcz et al. |
| 9,425,596 B2 | 8/2016 | Laverdiere et al. |
| 2006/0005988 A1 | 1/2006 | Jorgensen |
| 2006/0272142 A1 | 12/2006 | Johnson |
| 2007/0026735 A1 * | 2/2007 | Pyron ............... B60R 16/0222 16/222 |
| 2007/0206914 A1 * | 9/2007 | Tapper ............... H02G 3/083 385/147 |
| 2007/0254525 A1 * | 11/2007 | Pyron ............... H02G 3/085 439/584 |
| 2007/0261881 A1 | 11/2007 | Wronski |
| 2008/0230267 A1 | 9/2008 | de la Borbolla |
| 2008/0296061 A1 | 12/2008 | Kerr, Jr. |
| 2009/0205865 A1 | 8/2009 | Korcz |
| 2013/0153265 A1 | 6/2013 | Chen |
| 2013/0233615 A1 | 9/2013 | Pimentel |
| 2014/0262486 A1 | 9/2014 | Korcz et al. |
| 2014/0262488 A1 | 9/2014 | Korcz et al. |
| 2015/0090488 A1 | 4/2015 | Laverdiere et al. |
| 2015/0357806 A1 | 12/2015 | Korcz et al. |
| 2016/0099554 A1 | 4/2016 | Korcz et al. |
| 2016/0105011 A1 | 4/2016 | Korcz et al. |
| 2017/0163014 A1 * | 6/2017 | Korcz ............... H02G 15/007 |
| 2019/0109410 A1 * | 4/2019 | Johnson ............ H01R 13/5816 |

* cited by examiner

CABLE CONNECTOR

CROSS-REFERENCE TO RELATED APPLICATION

This application claims the benefit of U.S. Provisional Application Ser. No. 62/569,246, filed Oct. 6, 2017, the entire contents of this document are hereby incorporated by reference herein.

BACKGROUND

The present disclosure relates to connectors, particularly connectors for receiving and retaining an electrical conductor.

SUMMARY

In one aspect, a connector is configured to secure a configured to secure a conductor to an electrical box. The connector includes a body having an outer wall with a terminal edge, and a passageway extending along a longitudinal axis. A plurality of fingers is coupled to the body and extends toward the longitudinal axis. The plurality of fingers is cantilevered with the body. Each finger of the plurality of fingers includes a slot that provides communication into the passageway. The slot extends from the terminal edge of the body substantially along the length of each finger.

In another aspect, a connector is configured to secure a configured to secure a conductor to an electrical box. The connector includes a body having an outer wall. The body includes a first slot traversing the outer wall and a second slot traversing the outer wall. The second slot is spaced apart from the first slot. The body also includes a terminal edge. The first slot and the second slot extend to the terminal edge so that the terminal edge is discontinuous and includes a first section and a second section.

In yet another aspect, a connector is configured to secure a configured to secure a conductor to an electrical box. The connector includes a body having an outer wall. The body includes a passageway defined by the outer wall. The passageway extends along a longitudinal axis. The body also includes a first slot, a second slot, and a third slot. The slots traverse the outer wall. The second slot is spaced apart from the first slot, and the third slot is spaced apart from the first and second slots. Substantially any transverse section of the body orthogonal to the longitudinal axis includes a profile having a discontinuous outer perimeter.

Other aspects of the disclosure will become apparent by consideration of the detailed description and accompanying drawings.

DETAILED DESCRIPTION

Figure 1:
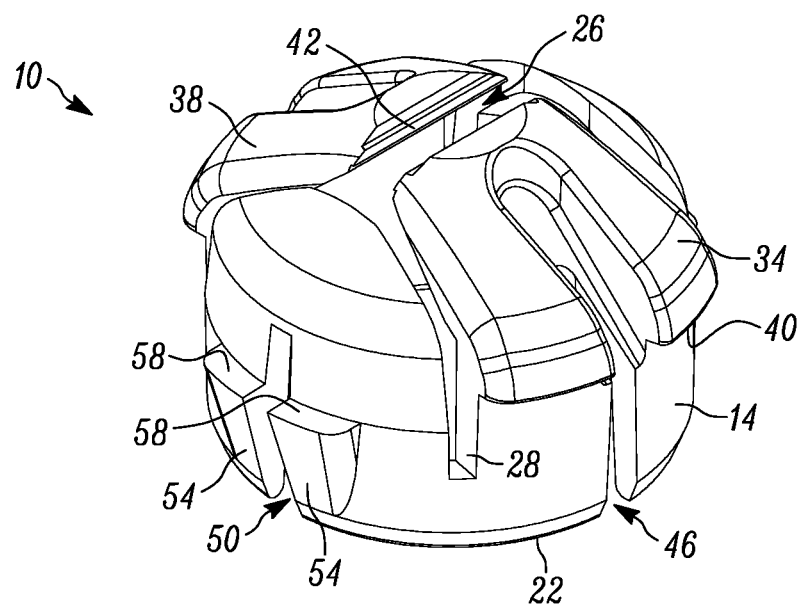
FIG. 1 is a first perspective view of a connector.
Figure 2:
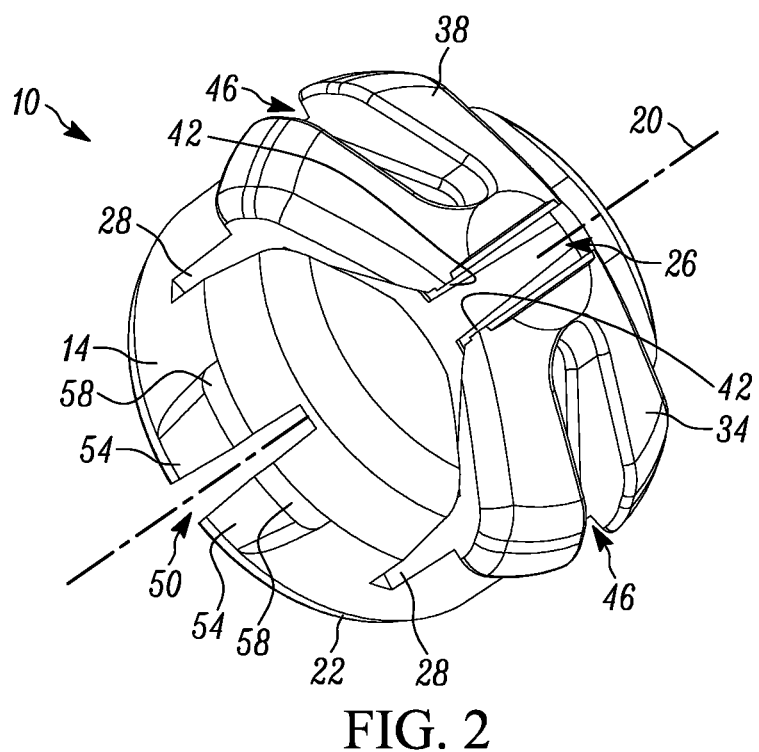
FIG. 2 is a second perspective view of the connector of FIG. 1.
Figure 3:
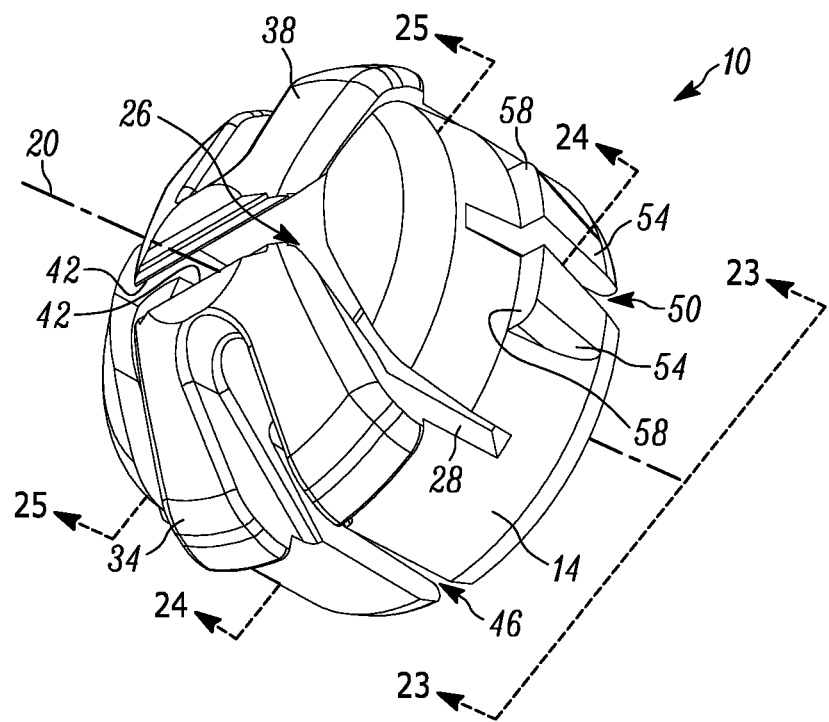
FIG. 3 is a third perspective view of the connector of FIG. 1.
Figure 4:
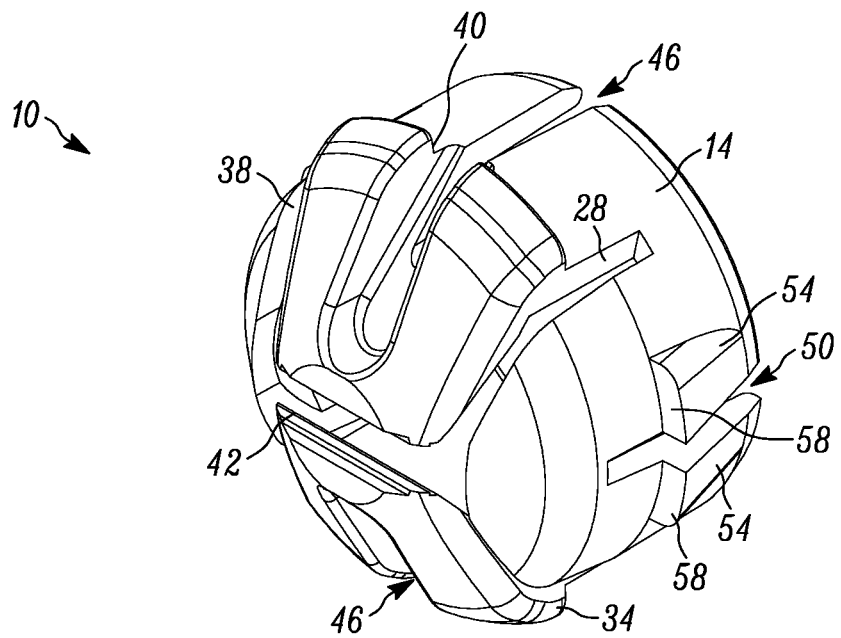
FIG. 4 is a fourth perspective view of the connector of FIG. 1.
Figure 5:
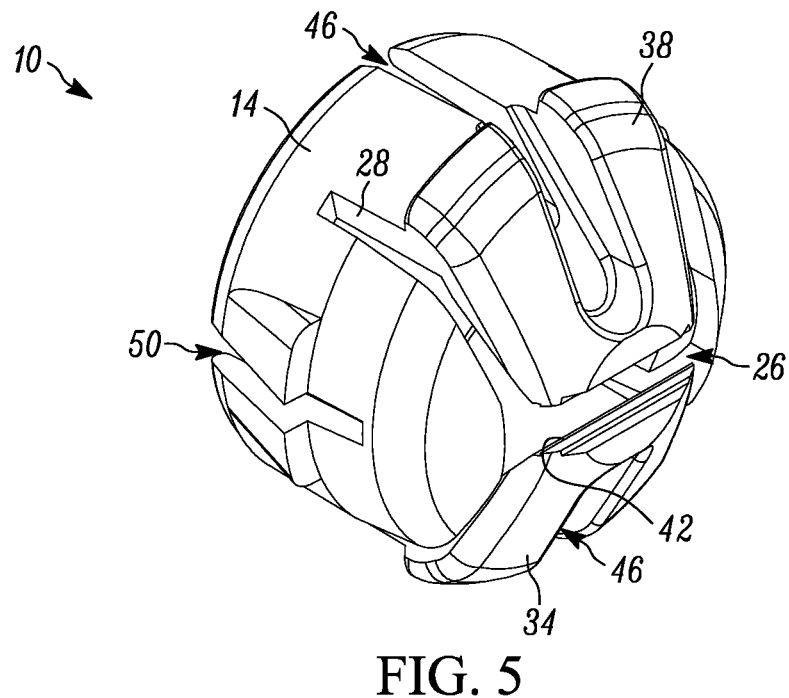
FIG. 5 is a fifth perspective view of the connector of FIG. 1.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a connector for engaging and securing an electrical conductor. The conductor can be positioned in a slot of the connector, and tabs or fingers secure the conductor against removal from the connector.

As shown in FIGS. 1-9, a connector 10 (e.g., a cable connector) includes a body 14. In the illustrated embodiment, the body 14 is made from a resilient material (e.g., rubber) and has a cylindrical portion, although in other embodiments, the body 14 may be made from another material and may have another shape. The body 14 includes a passageway 18 that extends from one end of the body 14 to another end along a passageway axis 20. One end of the body 14 includes a first or lower edge 22. In the illustrated embodiment, the lower edge 22 is circular in shape and has a width approximately equal to a width of the body 14. Another end of the body 14 includes a gap 26. In the illustrated embodiment, the gap 26 is fully defined by the body 14. In other words, the gap 26 has a completely enclosed outer perimeter. The gap 26 also includes a plurality of channels 28 that extend along the body 14 parallel to the passageway axis 20. The illustrated gap 26 includes four channels 28.

Tabs or fingers 34, 38 are connected to the body. The fingers 34, 38 define at least a portion of the perimeter of the gap 26. In the illustrated embodiment, the cable connector 10 includes a first finger 34 and a second finger 38; in other embodiments, the cable connector 10 can include fewer or more fingers. The first finger 34 and the second finger 38 have a similar shape. Each finger 34, 38 is biased toward the passageway axis 20, and is cantilevered with respect to the body 14. The first finger 34 and the second finger 38 have a greater width proximate the perimeter of the body 14 that decreases toward the end of the finger proximate the passageway axis 20. Each of the first finger 34 and the second finger 38 includes a substantially straight edge 42 positioned adjacent the passageway axis 20. The straight edge 42 of the first finger 34 is positioned proximate the straight edge 42 of the second finger 38 in a facing arrangement.

The body 14 also includes slots 46, 50. In the illustrated embodiment, the body 14 includes a pair of first slots 46 and a pair of second slots 50. In the illustrated embodiment, each of the first slots 46 are positioned on diametrically opposite sides of the body 14 (i.e., 180 degrees apart) from one another, and each of the second slots 50 are positioned on diametrically opposite sides of the body 14 (i.e., 180 degrees apart) from one another. Additionally, the pair of first slots 46 is positioned 90 degrees apart from the pair of second slots 50. Both the pair of first slots 46 and the pair of second slots 50 extend from the lower edge 22 toward the gap 26. Both pairs of slots 46, 50 also provide communication through the body 14 and into the passageway 18.

Each of the first slots 46 is aligned with one of the fingers 34, 38 but does not extend through the straight edge 42 and into the gap 26. Each of the first slots 46 extends toward the straight edge 42, forming a U-shaped profile for each of the fingers 34, 38.

Figure 6:
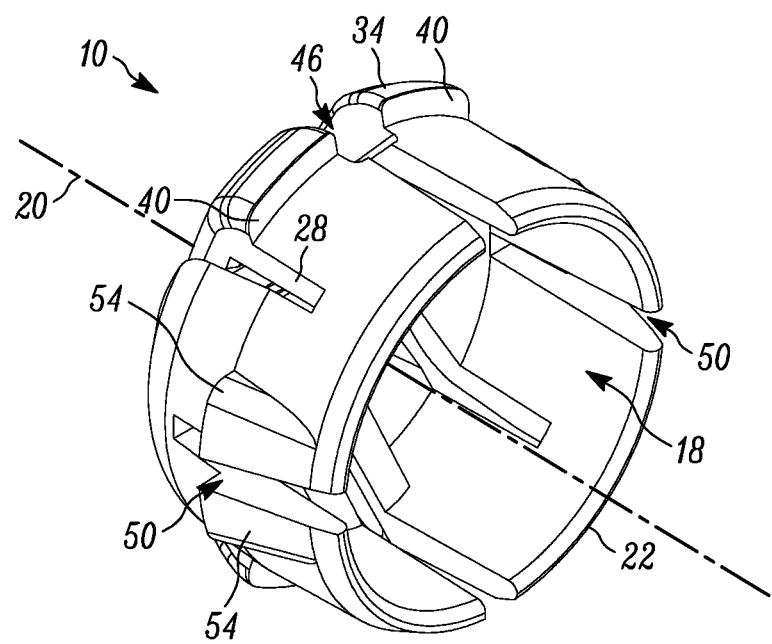
FIG. 6 is a sixth perspective view of the connector of FIG. 1.
Figure 7:
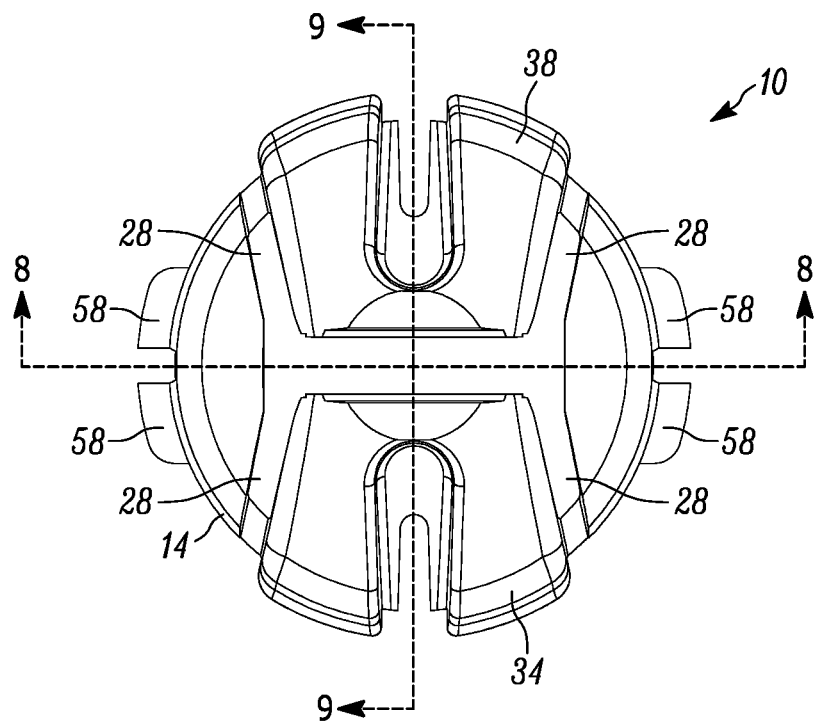
FIG. 7 is a plan view of the connector of FIG. 1.
Figure 8:
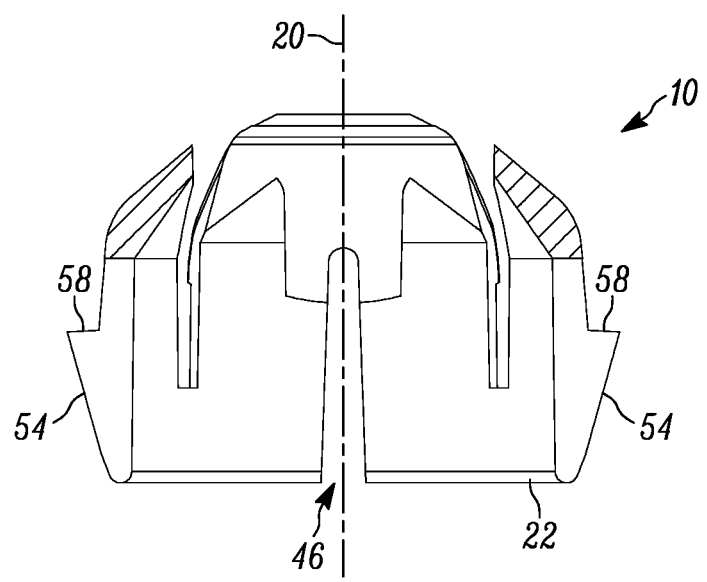
FIG. 8 is a cross-sectional view of the connector of FIG. 1 viewed along section 8-8.
Figure 9:
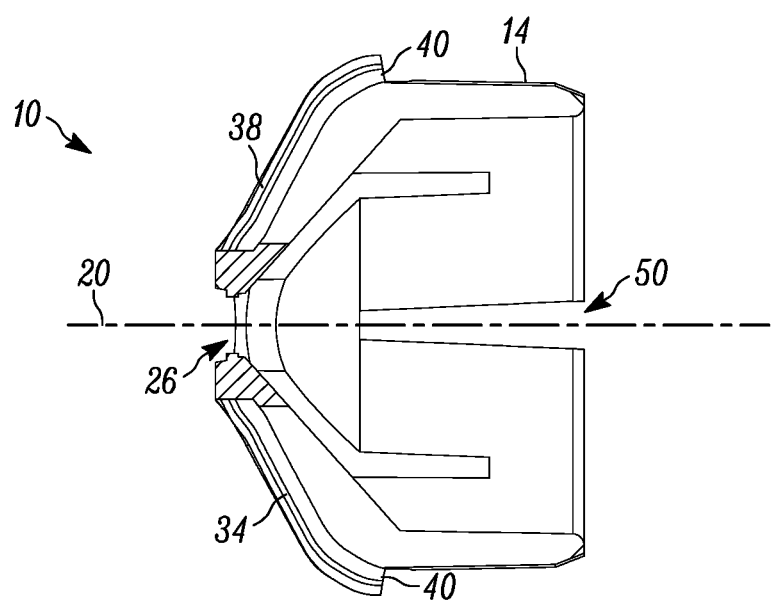
FIG. 9 is a side view of the connector of FIG. 1 viewed along section 9-9.
Figure 10:
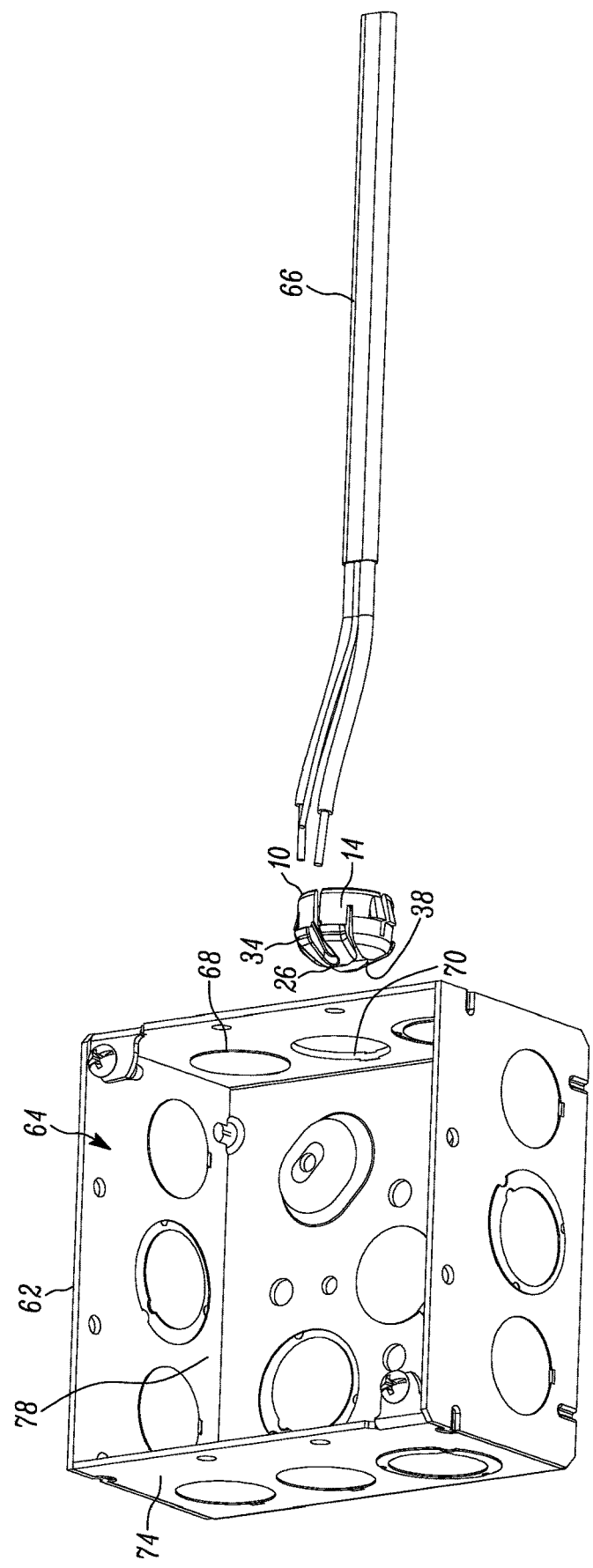
FIG. 10 is a perspective view of the connector of FIG. 1, a conductor, and a box.
Figure 11:
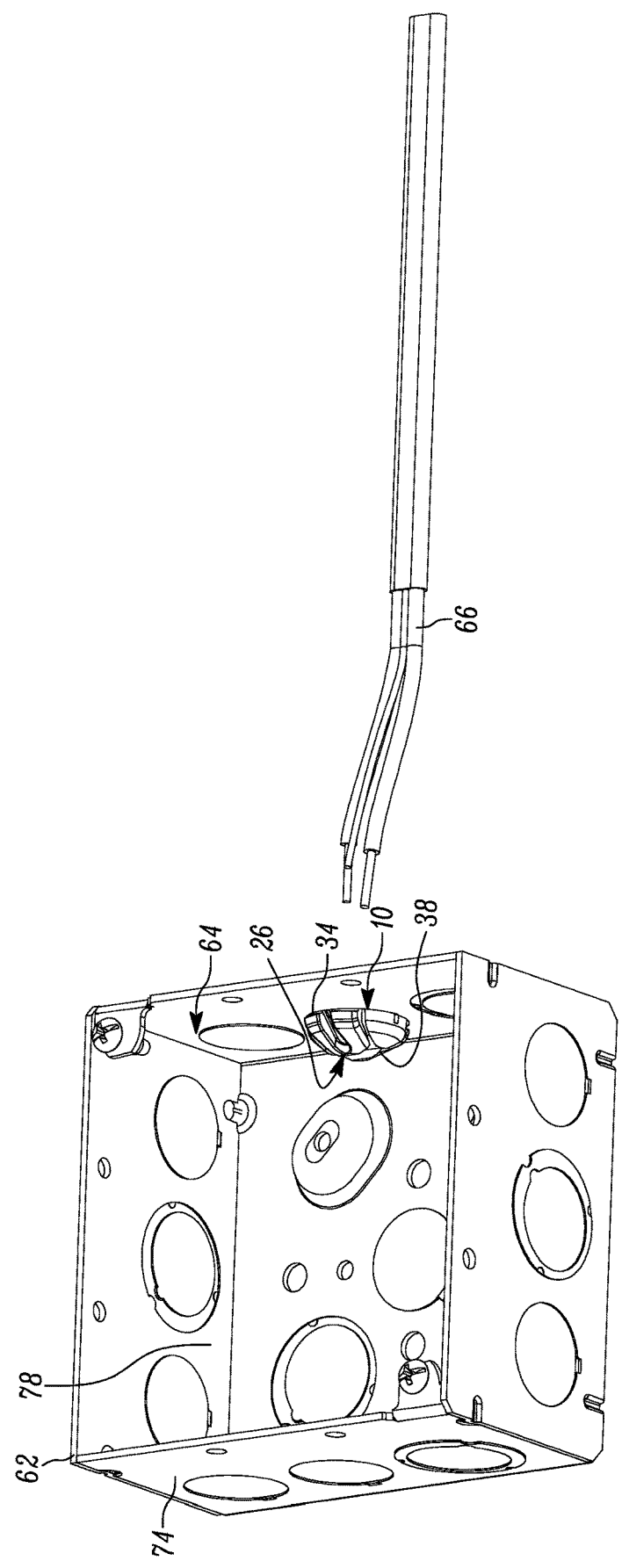
FIG. 11 is a perspective view of the connector, the conductor, and the box of FIG. 10, with the connector coupled to the box.
Figure 12:
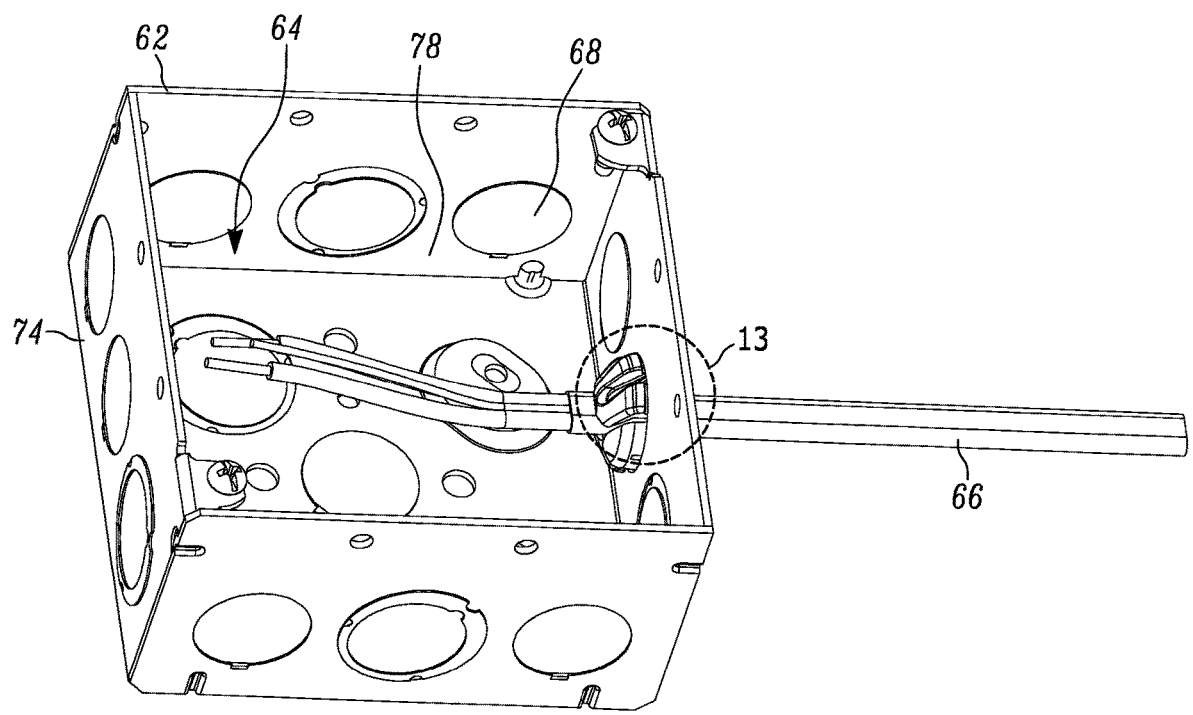
FIG. 12 is a perspective view of the connector, the conductor, and the box of FIG. 10, with the connector engaging the conductor.
Figure 13:
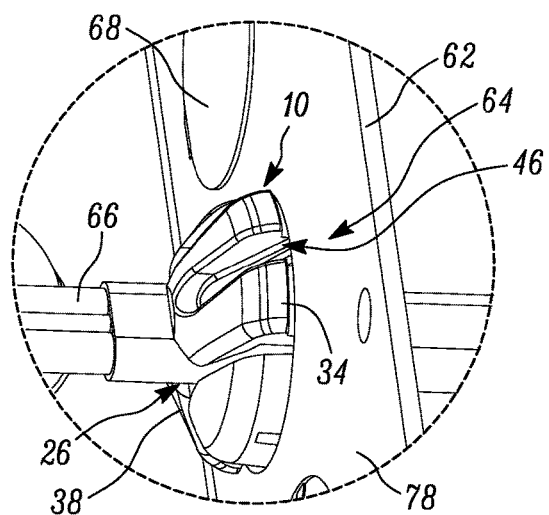
FIG. 13 is an enlarged view of area 13-13 of FIG. 12 showing the connector engaging the conductor.
Figure 14:
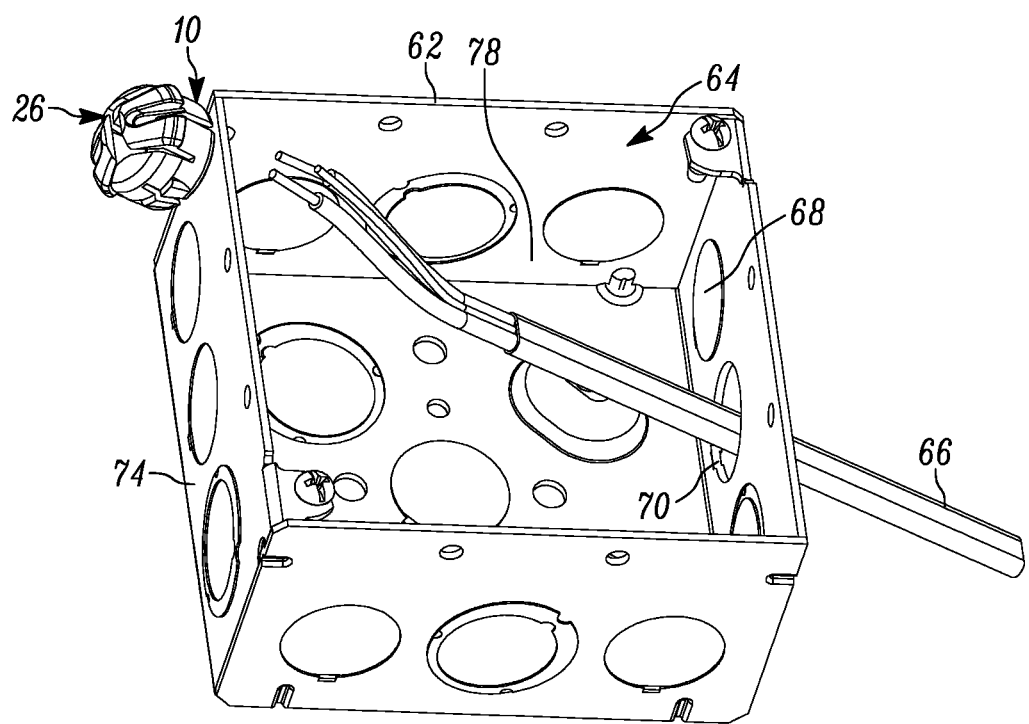
FIG. 14 is a perspective view of the connector of FIG. 1, a conductor, and a box, with a portion of the conductor extending into the box.
Figure 15:
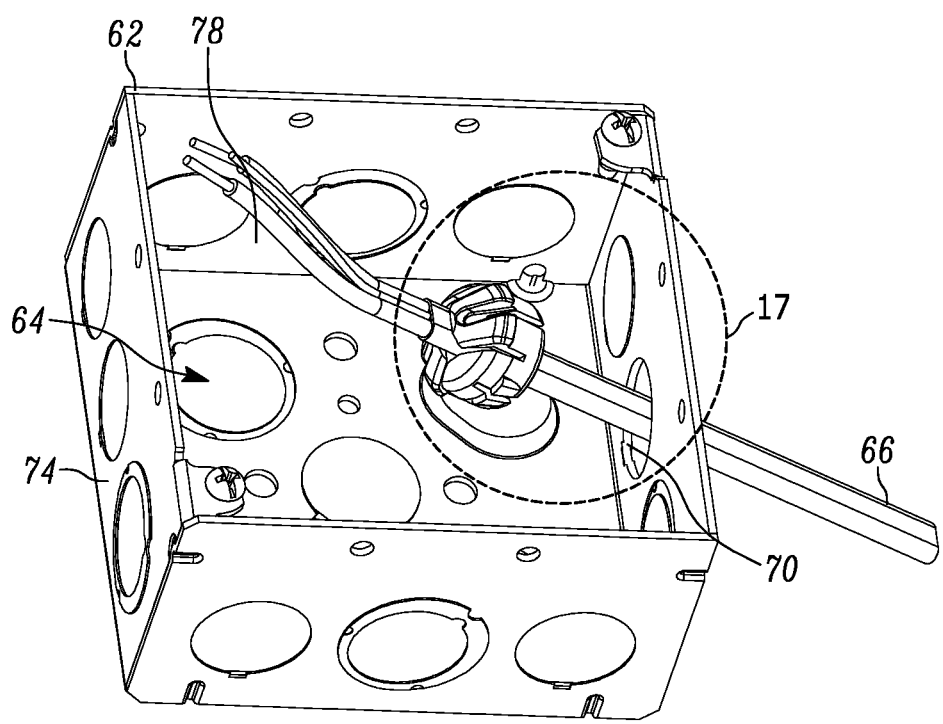
FIG. 15 is a perspective view of the connector, the conductor, and the box of FIG. 14, with the connector engaging the conductor.
Figure 16:
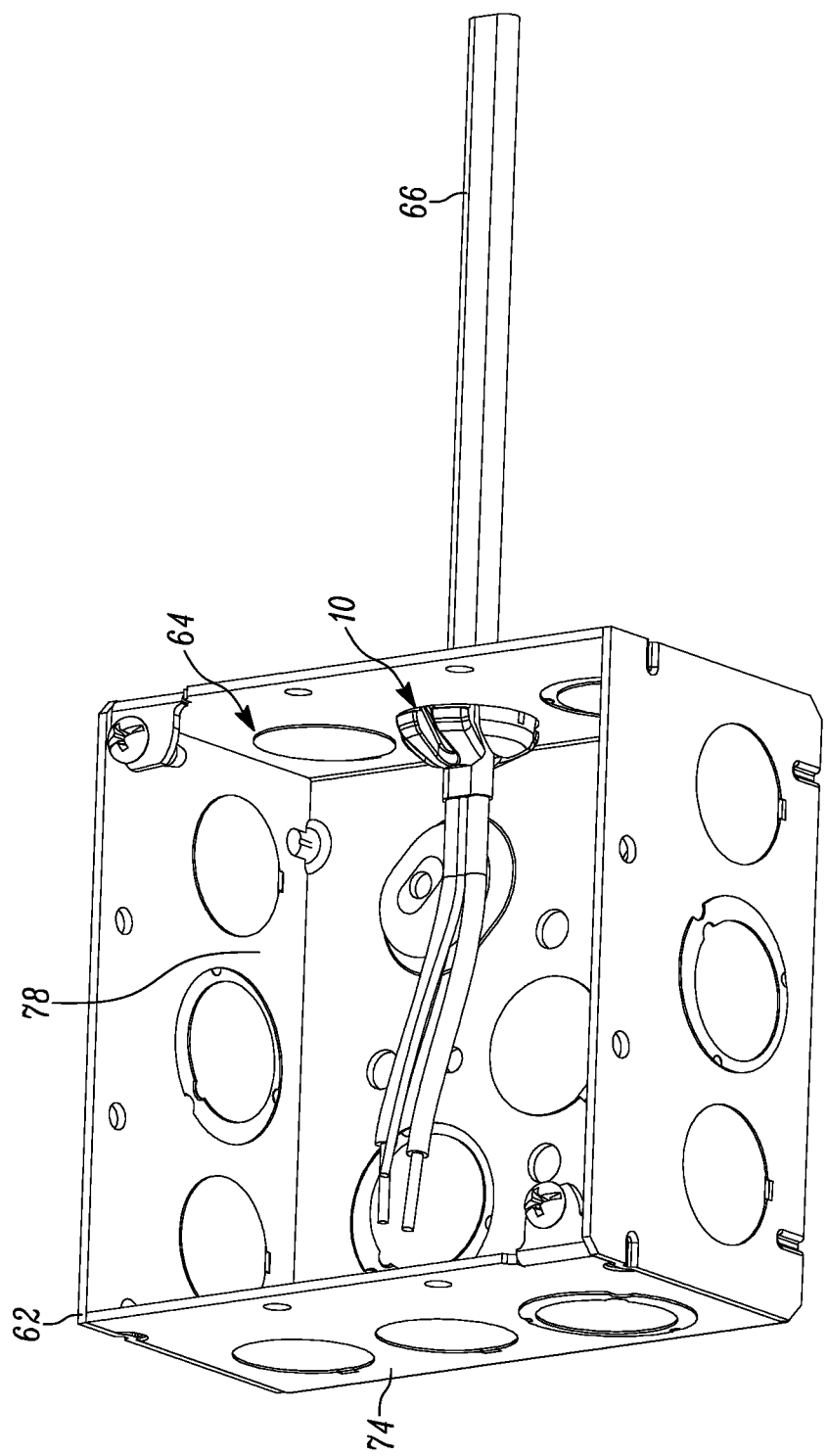
FIG. 16 is a perspective view of the connector, the conductor, and the box of FIG. 14, with the connector engaging the conductor and coupled to the box.
Figure 17:
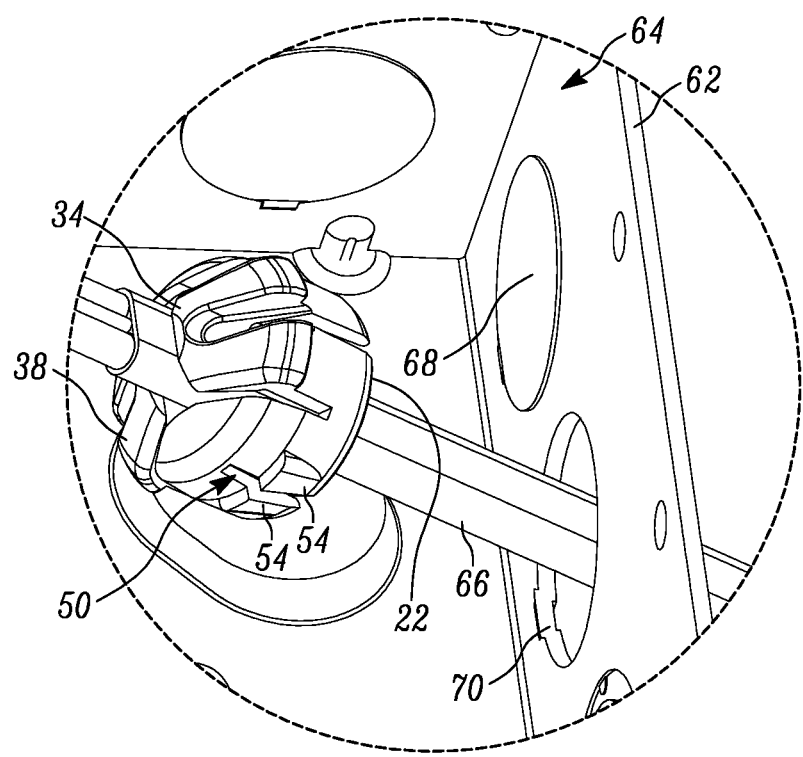
FIG. 17 is an enlarged view of area 17-17 of FIG. 15 showing the connector engaging the conductor.
Figure 18:
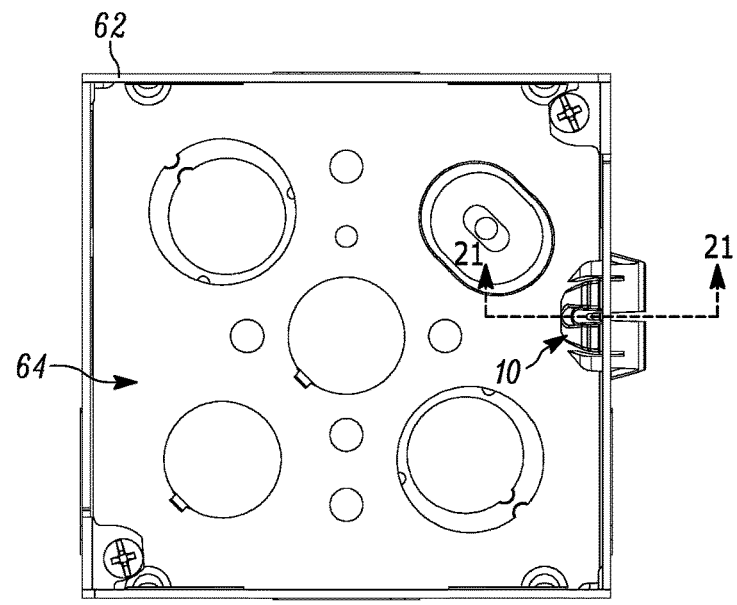
FIG. 18 is an elevation view of the box and a connector coupled to the box.
Figure 19:
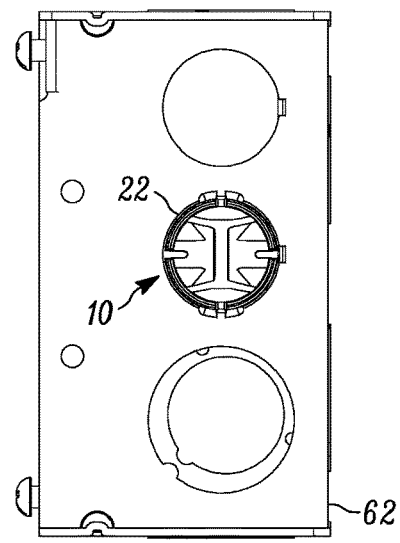
FIG. 19 is a side view of the connector and the box of FIG. 18.
Figure 20:
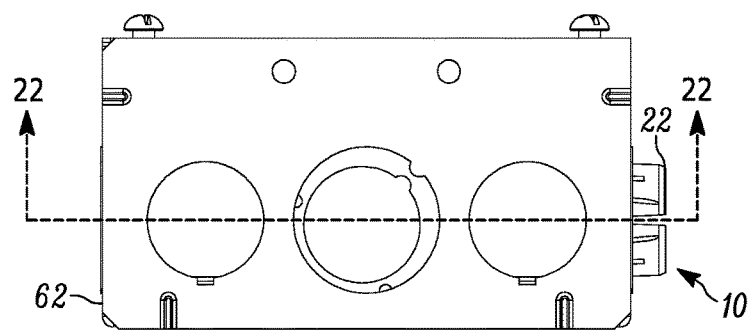
FIG. 20 is an end view of the connector and the box of FIG. 18.
Figure 22:
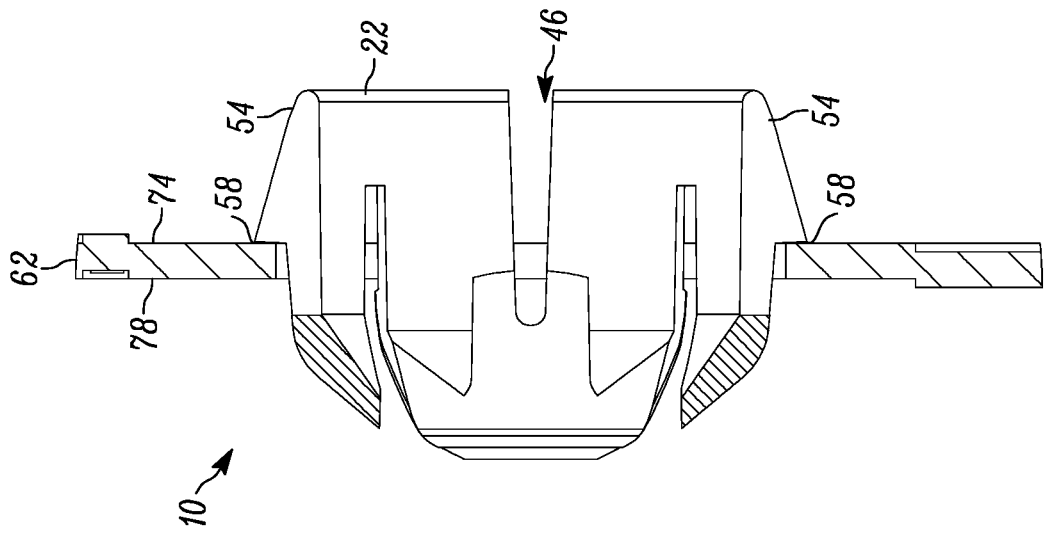
FIG. 22 is a cross-sectional view of the connector and box of FIG. 20, viewed along section 22-22.
Figure 21:
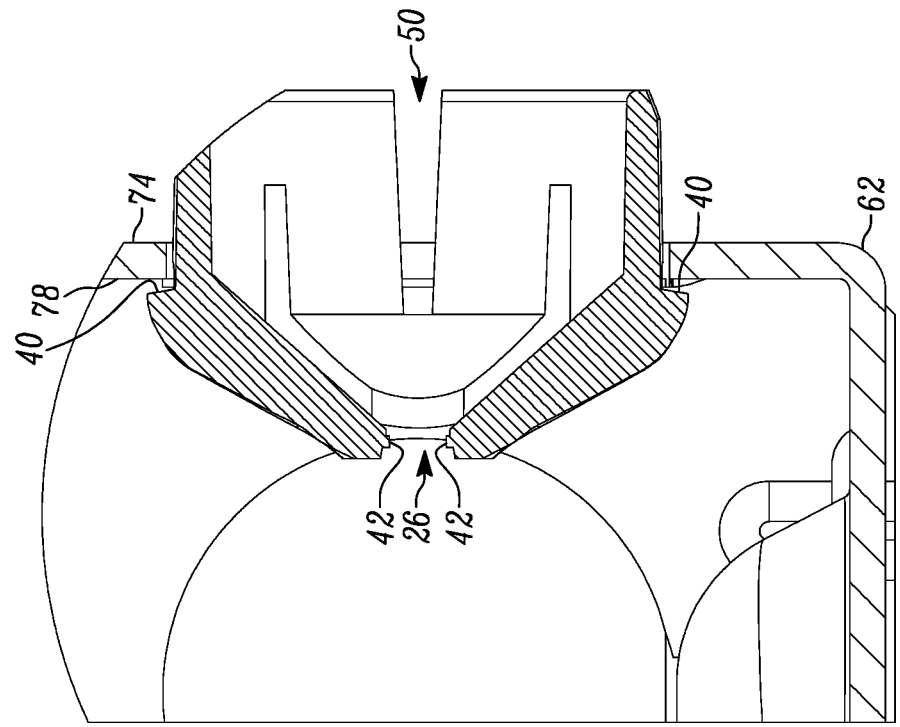
FIG. 21 is a cross-sectional view of the connector and box of FIG. 18, viewed along section 21-21.

The pair of second slots 50 is offset from the fingers 34, 38. In the illustrated embodiment, each of the second slots 50 extends in a direction that is substantially parallel to the passageway axis 20 (FIG. 6). An axial length of each of the second slots 50 (that is, the length measured in a direction parallel to the passageway axis 20) is less than an axial length of each of the first slots 46. In the illustrated embodiment, each channel 28 is positioned between an adjacent first slot 46 and second slot 50.

An outer periphery of the body 14 includes stop surfaces 40. The body 14 also includes inclined surfaces 54 positioned on either side of the second slots 50, extending from the lower edge 22 at least partially along the pair of second slots 50. In the illustrated embodiment, the inclined surfaces 54 do not have an axial length equal to the axial length of the pair of second slots 50, although in other embodiments, the axial length of the inclined surfaces 54 can be greater than or equal to the axial length of the pair of second slots 50. The inclined surfaces 54 have a greater width proximate the gap 26 (that is, the width measured in a direction orthogonal to the passageway axis 20) than proximate the lower edge 22. The greater width of the each inclined surface 54 forms a lip 58 that extends off of the body 14 in a direction orthogonal to the passageway axis 20.

As shown in FIGS. 10-17, the connector 10 may be inserted into a box 62 and coupled to a conductor 66. The box 62 includes one or more knockout sections 68. Each knockout section may be removed to create an aperture 70 with a radius substantially similar to the radius of a portion of the body 14. The connector 10 may be inserted into the aperture 70 in either a first direction (FIGS. 10-13) or a second direction (FIGS. 14-17).

As shown in FIGS. 18-22, in the illustrated embodiment, the connector 10 is inserted through the aperture 70 so that the gap 26 is positioned within an interior 64 of the box 62, although in other embodiments, the connector 10 may be inserted through the aperture 70 so that the gap 26 is positioned outside of the box 62. While inserted in the aperture 70, the lip 58 (FIG. 22) of each inclined surface 54 abuts a first retaining surface or outer surface 74 of the box 62, and the stop surfaces 40 (FIG. 21) of the first finger 34 and the second finger 38 are proximate a second retaining surface or inner surface 78 of the box 62.

Referring to FIGS. 10-13, a first method for installing the connector 10 includes removing the knockout section to create the aperture 70, and then inserting the connector 10 through the aperture 70 with the first finger 34 and the second finger 38 extending into the interior 64 of the box 62. Since the first finger 34 and the second finger 38 are resiliently biased toward the passageway axis 20, the width of the gap 26 is less than the width of the body 14 proximate the lower edge 22. As the connector 10 is inserted into the aperture 70, the first slots 46 and the second slots 50 (FIGS. 1-9) permit the body 14 to flex, enabling the fingers 34, 38 and a portion of the body 14 to pass through the aperture 70. Once the fingers 34, 38 are positioned within the interior 64 of the box 62, the stop surfaces 40 (FIG. 23) and the lip 58 (FIG. 24) limit further translation of the connector 10 with respect to the box 62. The connector 10 is limited in its ability to slide further into the interior 64 of the box 62 or out of the box 62 because the diameter of the body 14 including either the stop surfaces 40 or the lips 58 exceeds the diameter of the aperture 70.

Once the connector 10 is positioned within the aperture 70, a conductor 66 may be positioned within the connector 10. The conductor 66 is inserted into the passageway 18 (FIG. 6) proximate the lower edge 22, along the passageway axis 20 (FIG. 6), and through the gap 26. The first finger 34 and the second finger 38 are biased towards the gap 26. As the conductor 66 extends through the gap 26, the width of the gap 26 increases as the first finger 34 and the second finger 38 move away from each other. The pair of first slots 46 provide increased resiliency to the plurality of fingers 34, 38 as they extend away from each other.

The straight edges 42 (FIG. 23), in addition to the bias of the fingers 34, 38, limits the ability of the conductor 66 to back out or be removed once it has passed through the gap 26. Because of their bias towards the gap 26, the fingers 34, 38 are positioned adjacent the conductor 66. Additionally, the straight edge 42 of the first finger 34 and the straight edge 42 of the second finger 38 create a clamp that limits the ability of the conductor 66 to be removed from the connector 10 proximate the lower edge 22.

As shown in FIGS. 14-17, a second method for installing the connector 10 includes removes the knockout section to create the aperture 70, and then inserting an end of the conductor 66 through the aperture 70 to the interior 64 of the box 62. The connector 10 is then positioned over the end of the conductor 66, and the end of the conductor 66 is inserted into the passageway 18 (FIG. 6) proximate the lower edge 22. The conductor 66 extends through and is secured within the gap 26 in a substantially similar manner to the method described above with respect to FIGS. 10-13.

After the conductor 66 is secured within the gap 26, the connector 10 and the conductor 66 are inserted into the aperture 70. The inclined surfaces 54 and the pair of second slots 50 allow the body 14 to flex so that the cable conductor 10 may pass through the aperture 70. The connector 10 is then positioned within the aperture 70 in substantially the same way as described above with respect to FIGS. 10-13.

Figure 23:
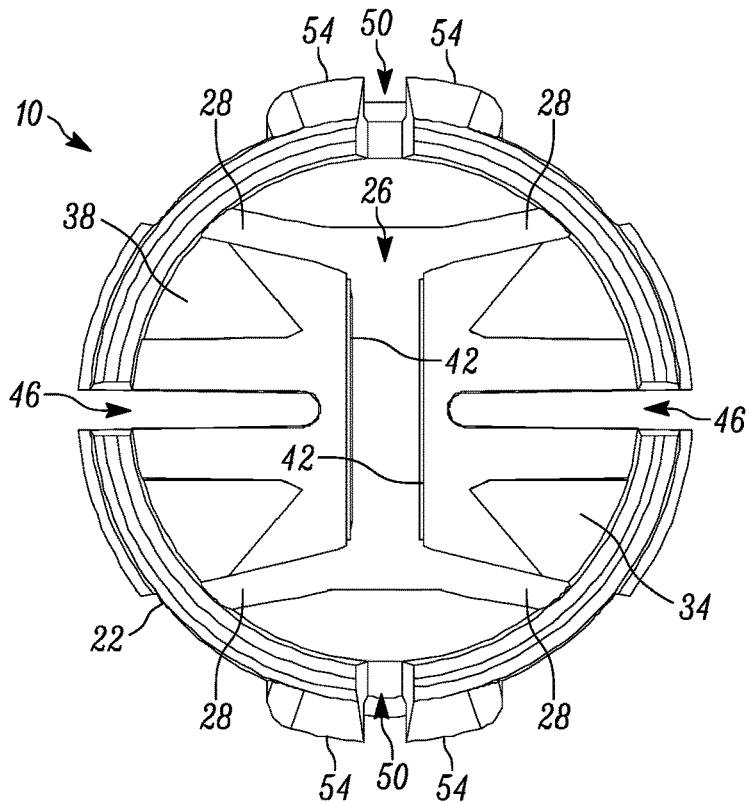
FIG. 23 is an end view of the connector of FIG. 3
Figure 24:
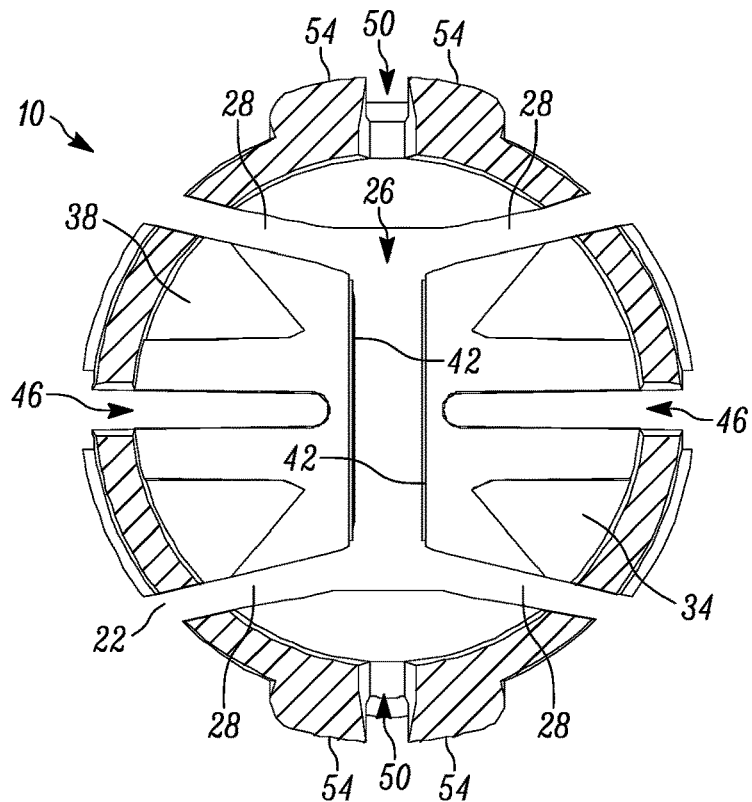
FIG. 24 is a cross-sectional view of the connector of FIG. 3, viewed along section 24-24.
Figure 25:
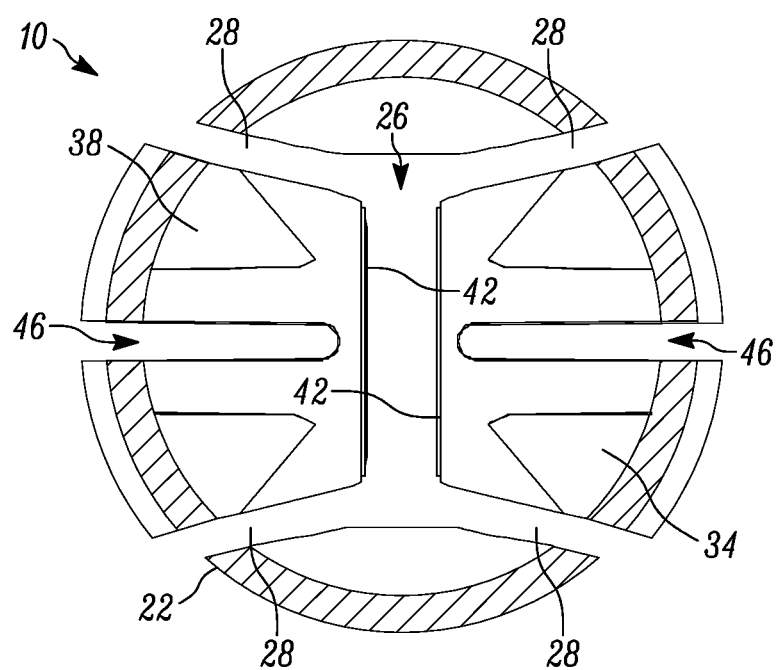
FIG. 25 is a cross-sectional view of the connector of FIG. 3, viewed along section 25-25.

In the illustrated embodiment, a transverse section of the cable connector 10 may be viewed at any point along the length of the passageway axis 20, and the profile of each transverse section has a discontinuous perimeter. FIGS. 23-25 illustrate transverse sections at various points along the length of the passageway axis 20. As stated above, the pair of first and second slots 46, 50 extend to the lower edge 22. Thus, when the cable connector 10 is viewed from the bottom, the perimeter formed by the lower edge 22 is not a continuous shape (e.g., circle). The pair of first and second slots 46, 50 break the lower edge 22 into distinct portions that make up a portion of the perimeter.

As shown in FIGS. 24 and 25, each cross section of the cable connector 10 orthogonal to the passageway axis 20 has a discontinuous profile. The spacing and different lengths of the pair of first and second slots 46, 50 and the channels 28 create different discontinuous patterns with different sized portions depending on where the cross-section is viewed. The discontinuities provide the cable connector 10 with increased flexibility, which assists in inserting and removing the cable connector 10 from the aperture 70.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A connector for a conductor, the connector configured to secure the conductor to an electrical box, the connector comprising:
    a body having an outer wall with a terminal edge, the body including a passageway extending along a longitudinal axis, and
    a plurality of fingers coupled to the body and extending toward the longitudinal axis, the plurality of fingers cantilevered with the body, each finger of the plurality of fingers including a slot providing communication into the passageway, the slot extending from the terminal edge of the body substantially along the length of each finger,
    wherein the body includes a first end and a second end, wherein the body is configured such that either the first end or the second end may be inserted first into an aperture.

2. The connector of claim 1, wherein the slots are first slots, the connector further comprising second slots positioned around the body.

3. The connector of claim 2, wherein the first slots and the second slots are positioned at 90 degree intervals around the body.

4. The connector of claim 2, wherein the first slots are located 180 degrees apart and the second slots are located 180 degrees apart, the second slots are offset from the plurality of fingers, the first slots are larger than the second slots.

5. The connector of claim 1, wherein the body includes an inclined surface with a greater width proximate the plurality of fingers than distal the plurality of fingers, the inclined surface defining a stop surface, the stop surface configured to abut a retaining surface.

6. The connector of claim 1, wherein the body includes a lip configured to abut a retaining surface.

7. A connector for a conductor, the connector configured to secure the conductor to an electrical box, the connector comprising:
    a body having an outer wall, the body including,
        a passageway defined by the outer wall and extending along a longitudinal axis,
        a first slot traversing the outer wall,
        a second slot spaced apart from the first slot, the second slot traversing the outer wall,
        a third slot spaced apart from the first and second slots, the third slot traversing the outer wall, wherein a transverse section of the body orthogonal to the longitudinal axis at each position along the longitudinal axis includes a profile having a discontinuous outer perimeter.

8. The connector of claim 1, wherein the connector is made from a resilient material, the slots providing the connector with increased resilience.

9. The connector of claim 1, wherein the body includes an inclined surface with a first width proximate the gap and a second width corresponding to the lower edge, the first width greater than the second width.

10. A connector for a conductor, the connector configured to secure the conductor to an electrical box, the connector comprising:
    a body having an outer wall, the body including,
        a first slot traversing the outer wall, and
        a second slot spaced apart from the first slot, the second slot traversing the outer wall, and
        a terminal edge, the first slot and the second slot extend to the terminal edge so that the terminal edge is discontinuous and includes a first section and a second section, and
        a passageway extending along a longitudinal axis, and
        a finger coupled to the body and extending toward the longitudinal axis, the finger cantilevered with the body, the finger includes the first slot.

11. The connector of claim 10, wherein the first slot and the second slot are positioned 90 degree apart along the body.

12. The connector of claim 10, wherein the first slot is one slot of a plurality of first slots and the second slot is one slot of a plurality of second slots.

13. The conductor of claim 12, wherein each slot of the plurality of first slots is located 180 degrees apart and each slot of the plurality of second slots is located 180 degrees apart, the first slots are larger than the second slots.

14. The connector of claim 12, wherein the first section and the second section are two sections of a plurality of sections of the terminal edge formed by the first and second plurality of slots.

15. The connector of claim 7, further comprising a finger coupled to the body and extending toward the longitudinal axis, the finger supported on the body in a cantilevered manner, the first slot extending through the finger.

16. The connector of claim 7, wherein the first slot is one of a plurality of first slots, the second slot is one of a plurality of second slots, and the third slot is one of a plurality of third slots, wherein the discontinuous outer perimeter is symmetric about a plane extending parallel to the longitudinal axis.

17. The connector of claim 7, wherein the first slot and the second slot extend to a terminal edge of the body so that the terminal edge is discontinuous and includes a first section and a second section.

18. The connector of claim 7, wherein the first slot is one slot of a plurality of first slots and the second slot is one slot of a plurality of second slots.

* * * * *